(12) United States Patent
Chen

(10) Patent No.: US 7,863,774 B2
(45) Date of Patent: Jan. 4, 2011

(54) MULTI-OUTPUT POWER SUPPLY

(75) Inventor: Yun-Chen Chen, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 272 days.

(21) Appl. No.: 12/266,272

(22) Filed: Nov. 6, 2008

(65) Prior Publication Data

US 2010/0110737 A1 May 6, 2010

(51) Int. Cl.
G05F 1/10 (2006.01)
H02J 3/00 (2006.01)
(52) U.S. Cl. .............................. 307/64; 307/65; 307/66; 307/17; 307/82; 307/23; 307/24
(58) Field of Classification Search .................. 307/64, 307/65, 17, 66, 23, 24, 82
See application file for complete search history.

(56) References Cited

U.S. PATENT DOCUMENTS

| 6,157,549 A * | 12/2000 | Nath ........................... 348/730 |
| 7,072,189 B2 * | 7/2006 | Kim et al. ..................... 363/16 |
| 7,483,281 B2 * | 1/2009 | Yang ............................ 363/71 |
| 7,499,294 B2 * | 3/2009 | Lin et al. ................... 363/21.06 |
| 7,791,222 B2 * | 9/2010 | Jung ............................ 307/99 |
| 2008/0192517 A1 * | 8/2008 | Lin et al. ....................... 363/52 |
| 2008/0309161 A1 * | 12/2008 | Jung ............................ 307/17 |
| 2010/0109432 A1 * | 5/2010 | Chang et al. .................. 307/23 |

* cited by examiner

*Primary Examiner*—Bao Q Vu
(74) *Attorney, Agent, or Firm*—Muncy, Geissler, Olds & Lowe, PLLC

(57) ABSTRACT

A multi-output power supply includes a standby power system and a main power system. The main power system has a transformer and a rectification output circuit connecting to the transformer to generate first output power. The power supply further has an output time series judgment circuit and a plurality of voltage regulation units connecting respectively to the standby power system and the rectification output circuit. The output time series judgment circuit has a preset reference potential compared with the potential of the first output power to determine whether to output a feedback signal. Each voltage regulation unit is connected to the output time series judgment circuit to receive the feedback signal and be activated normally and determine a regulation time spot to synchronously regulate the first output power to second output power. Thus the time difference for delivering the first output power and the second output power can be regulated.

7 Claims, 3 Drawing Sheets

MULTI-OUTPUT POWER SUPPLY

FIELD OF THE INVENTION

The present invention relates to a multi-output power supply and particularly to a power supply capable of providing multiple outputs and regulating output time of DC power of different voltages.

BACKGROUND OF THE INVENTION

The motherboards of the present computer systems mostly adopt ATX (Advanced Technology Extended) architecture. Compared with the traditional AT (Advanced Technology) architecture, the most significant feature of ATX architecture is adding a regular power supply of 5 VSB and makes 3.3V the standard supply voltage. To provide suitable power supply to the ATX motherboard the power supply must have capability to provide corresponding power output, including output voltages at 3.3V, 5V and 12V.

The conventional power supply conforming to the ATX architecture generally has an AC/DC transformer to generate DC power of different voltages to supply the ATX motherboard. However, energy conversion efficiency to generate the DC power through AC/DC transformation still leaves a lots to be desired, hence is not a satisfactory approach especially at present when energy saving is a big concern in the industry and public opinion. Moreover, output DC power is not stable in the aforesaid approach and operation of the motherboard could be affected. To address the concerns mentioned above, a technology adopted a Voltage Regulator Module (VRM) has been developed. Adopted such a technique, the AC/DC transformer of the power supply outputs only DC power of 12V, and a VRM circuit is added at the rear end of the transformer to allow the DC power of 12V to be transformed through a DC/DC approach to become DC power of 5V or 3.3V. The DC/DC transformation has improved energy transformation efficiency over the AC/DC transformation. Thus energy resource can be better utilized and energy saving effect can be achieved. In addition, DC/DC transformation also provides more stable DC power at low voltages, therefore can enhance operation reliability of the motherboard.

While the power supply adopted the VRM circuit has improved energy transformation efficiency, there is a time difference in output of DC power of 12V and 5V/3.3V. Referring to FIG. 4, when the power supply is started, the DC power of 12V can be output after time t1 is elapsed, but the DC power of 5V/3.3V can be supplied only after time t2 has elapsed. Namely the DC power of 12V and 5V/3.3V are supplied at different times of t1 and t2. The difference of t1–t2 also is called a time interval. In the general machine start condition, in order to ensure that the power supply providing an effective supply voltage, the ATX motherboard detects whether the power provided by the power supply is normal. As the conventional power supply adopted the VRM circuit forms the time interval t1–t2 on DC power of different voltages, the ATX motherboard could make misjudgment during detection and result in start failure of the computer system.

SUMMARY OF THE INVENTION

The primary object of the present invention is to regulate the delay time of DC power of different voltages output from a power supply to prevent misjudgment during detection of the power supply and failure of machine start. To achieve the foregoing object, the invention provides a multi-output power supply connecting to a power source to receive input power. It includes a standby power system to transform the input power to standby power and a main power system. The main power system includes a transformer to receive the input power and regulate the voltage to become voltage-transformed electric power and a rectification output circuit connecting to the transformer to regulate the voltage-transformed electric power to become first output DC power. The power supply further has an output time series judgment circuit and a plurality of voltage regulation units. The output time series judgment circuit is electrically connected to the rectification output circuit and the standby power system to receive the first output power and the standby power to be activated therewith. The output time series judgment circuit has a preset reference potential compared with the potential of the first output power. The comparison result determines whether to output a feedback signal. The voltage regulation units are electrically connected to the rectification output circuit to receive respectively the standby power from the standby power system and the feedback signal from the output time series judgment circuit so that they can be activated in normal conditions and to determine a regulation time spot on which synchronous regulation of the first output power to become second output power to be delivered is decided.

The rectification output circuit and the output time series judgment circuit are bridged by a voltage division circuit which has two resistors. Through the resistance ratio of the two resistors, the potential of the first output power sent to the output time series judgment circuit can be regulated.

In the invention, the output time series judgment circuit has a comparison unit to receive the potential of the first output power and the preset reference potential to perform comparison and a voltage source to provide power for the feedback signal. The comparison unit has a ground end to direct the feedback signal to be grounded. The voltage source to provide power for the feedback signal is the standby power system. When the potential of the first output power is greater than the preset reference potential, no feedback signal is output. When the potential of the first output power is lower than the preset reference potential, the output time series judgment circuit continuously outputs the feedback signal to the voltage regulation units, and transformation of the first output power to the second output power stops. In addition, a diode is provided between the output time series judgment circuit and the voltage regulation units. The diode has an anode connecting to the output time series judgment circuit and a cathode of the diode connecting to the voltage regulation units.

The multi-output power supply of the invention can be used in applications which have output time differences among DC power of different voltages, such as a power supply equipped with a VRM circuit. Through the invention, the output time difference can be regulated so that misjudgment that might otherwise occur during detection of the motherboard in computer start process can be prevented, and start failure of the computer system can be avoided.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
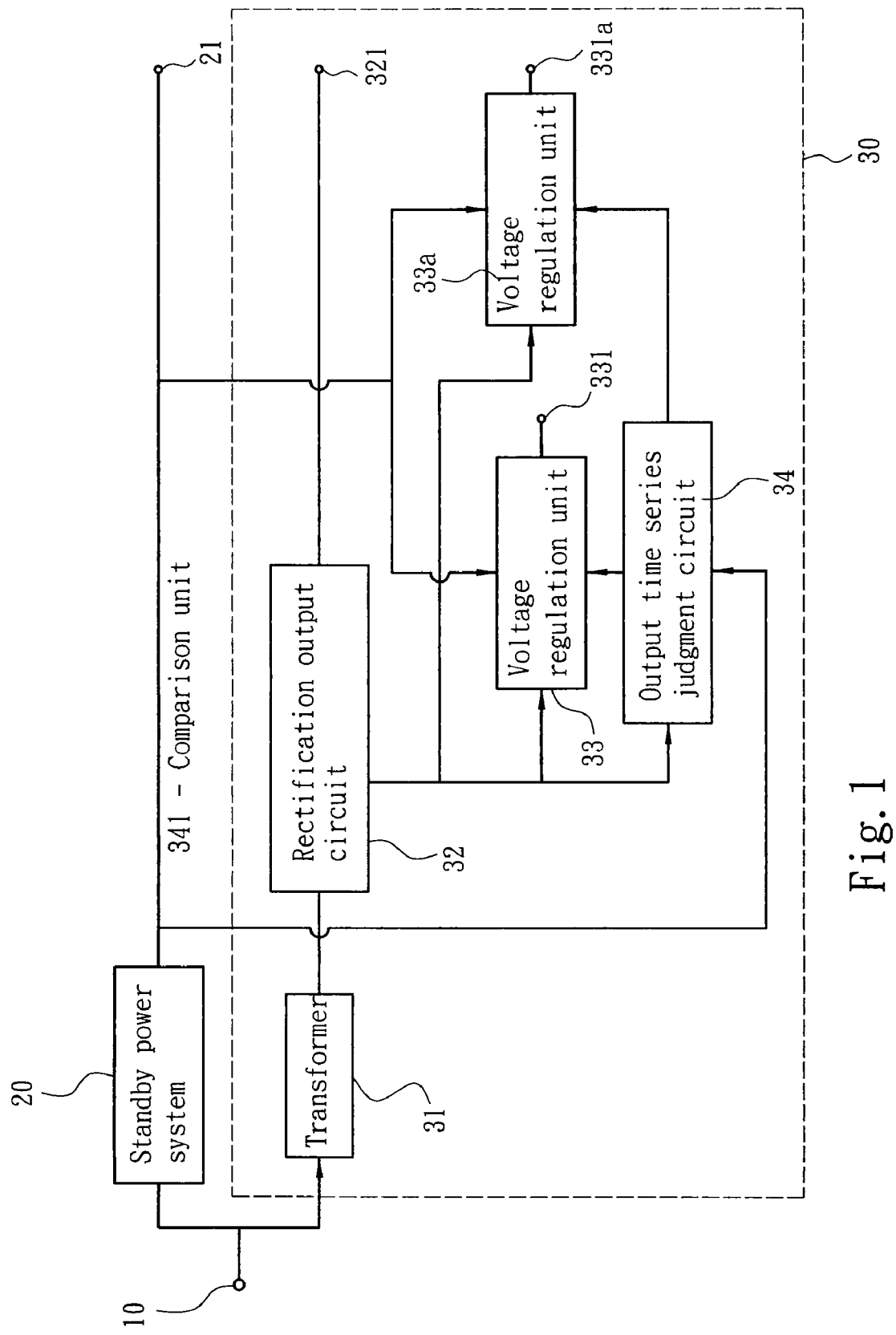
FIG. 1 is a circuit block diagram of an embodiment of the multi-output power supply of the invention.

Please refer to FIG. 1 for the circuit block diagram of an embodiment of the invention. The multi-output power supply according to the invention is connected to a power source 10 to receive input power. The power supply includes a standby power system 20 and a main power system 30. The standby power system 20 receives the input power from the power source 10 and transforms the input power to standby power 21 to be output in normal conditions. The main power system 30 performs AC/DC transformation in machine start conditions. The main power system 30 includes a transformer 31 to receive the input power and regulate the voltage to become voltage-transformed electric power and a rectification output circuit 32 connecting to the transformer 31 to regulate the voltage-transformed electric power to become first output power 321. The power supply further has a plurality of voltage regulation units 33 and 33a connecting electrically to the rectification output circuit 32 and the standby power system 20. In this embodiment, two sets of the voltage regulation units 33 and 33a are provided. However this serves only as an example and not as the limitation of the number of the voltage regulation units. The voltage regulation units 33 and 33a receive the standby power 21 from the standby power system 20 as a driving voltage so that the voltage regulation units 33 and 33a receive the first output power 321 from the rectification output circuit 32 in the normal conditions and regulate to become second output power 331 and 331a. Thereby the power supply can provide multiple output power at different voltages.

Figure 3:
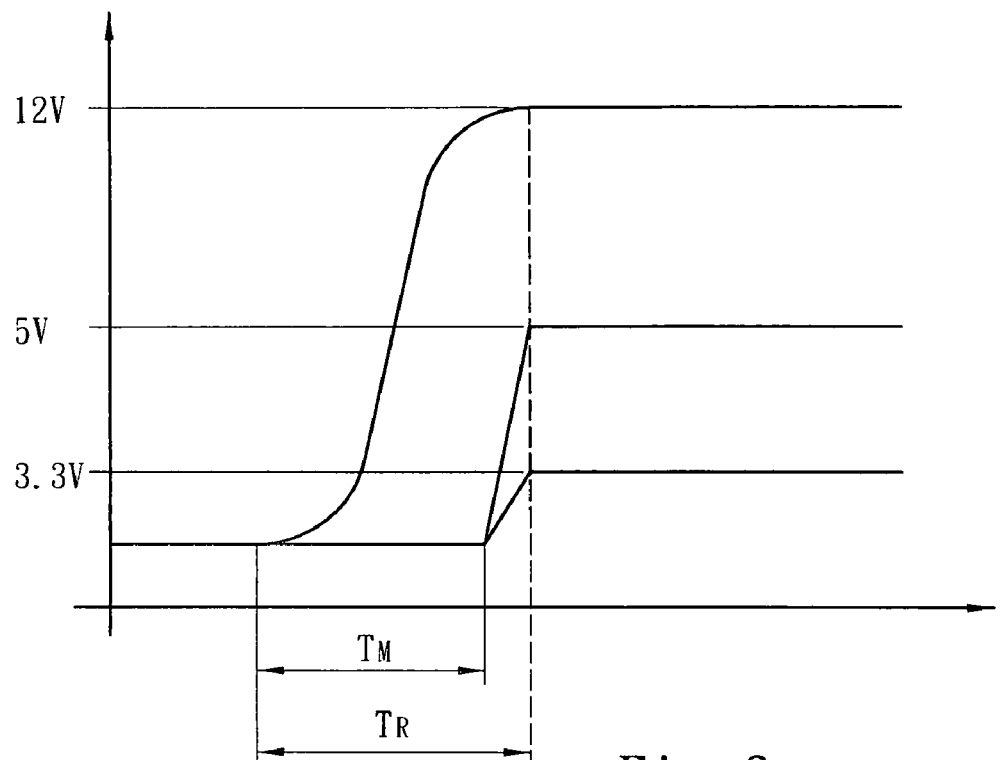
FIG. 3 is a time series chart of output voltage according to an embodiment of the invention.
Figure 4:
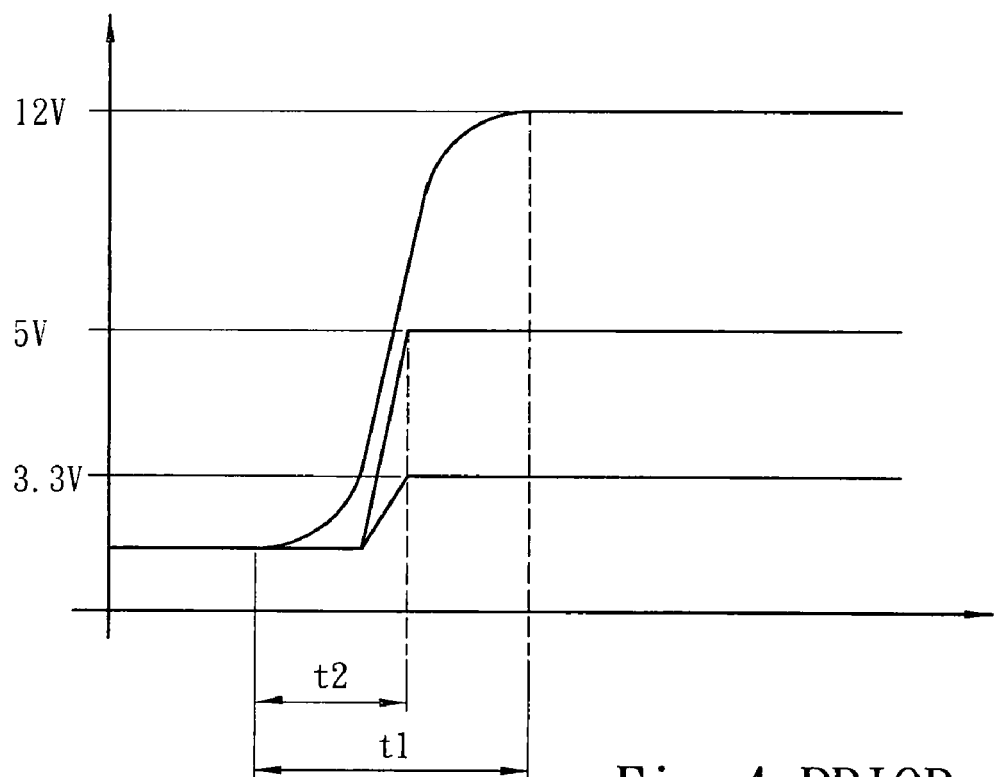
FIG. 4 is a time series chart for delivering DC power of 12V, 5V and 3.3V according to a conventional power supply adopted the VRM technique.

The rectification output circuit 32 requires a period of voltage boosting time ($T_R$) to regulate the voltage-transformed electric power to become the first output power 321 and reach a standard potential 12V as shown in FIG. 3. In order to control output time difference of the first output power 321 and the second output power 331 and 331a, in the invention each of the voltage regulation units 33 and 33a is electrically connected to an output time series judgment circuit 34. The output time series judgment circuit 34 receives the standby power 21 from the standby power system 20 and the first output power 321 from the rectification output circuit 32. The standby power 21 serves as the supply voltage for the output time series judgment circuit 34. The first output power 321 is compared with a preset reference potential in output time series judgment circuit 34. Based on whether the potential of the first output power 321 is higher or lower than the preset reference potential in the comparison a feedback signal is sent to the voltage regulation units 33 and 33a to proceed or stop regulation of the first output power 321 to the second output power 331 and 331a. In the event that the preset reference potential of the output time series judgment circuit 34 is 6V, and the potential of the first output power 321 which the output time series judgment circuit 34 gets from the rectification output circuit 32 is less than 6V, the output time series judgment circuit 34 sends the feedback signal to the voltage regulation units 33 and 33a to stop regulation of the first output power 321 to the second output power 331 and 331a. In this embodiment, the potentials of the second output power 331 and 331a are respectively 5V and 3V. In the event that the potential of the first output power 321 got by the output time series judgment circuit 34 is higher than 6V, the output time series judgment circuit 34 stops sending the feedback signal to the voltage regulation units 33 and 33a. Then the voltage regulation units 33 and 33a regulate normally the first output power 321 to the second output power 331 and 331a. The time which the output time series judgment circuit 34 sends the feedback signal to the voltage regulation units 33 and 33a to stop regulation of the first output power 321 to the second output power 331 and 331a is defined as a regulation time ($T_M$) as shown in FIG. 3. Thus based on the time spot which the output time series judgment circuit 34 outputs the feedback signal, the time difference between the first output power 321 and the second output power 331 and 331a can be controlled to meet the requirement of an electronic load at a rear end.

Figure 2:
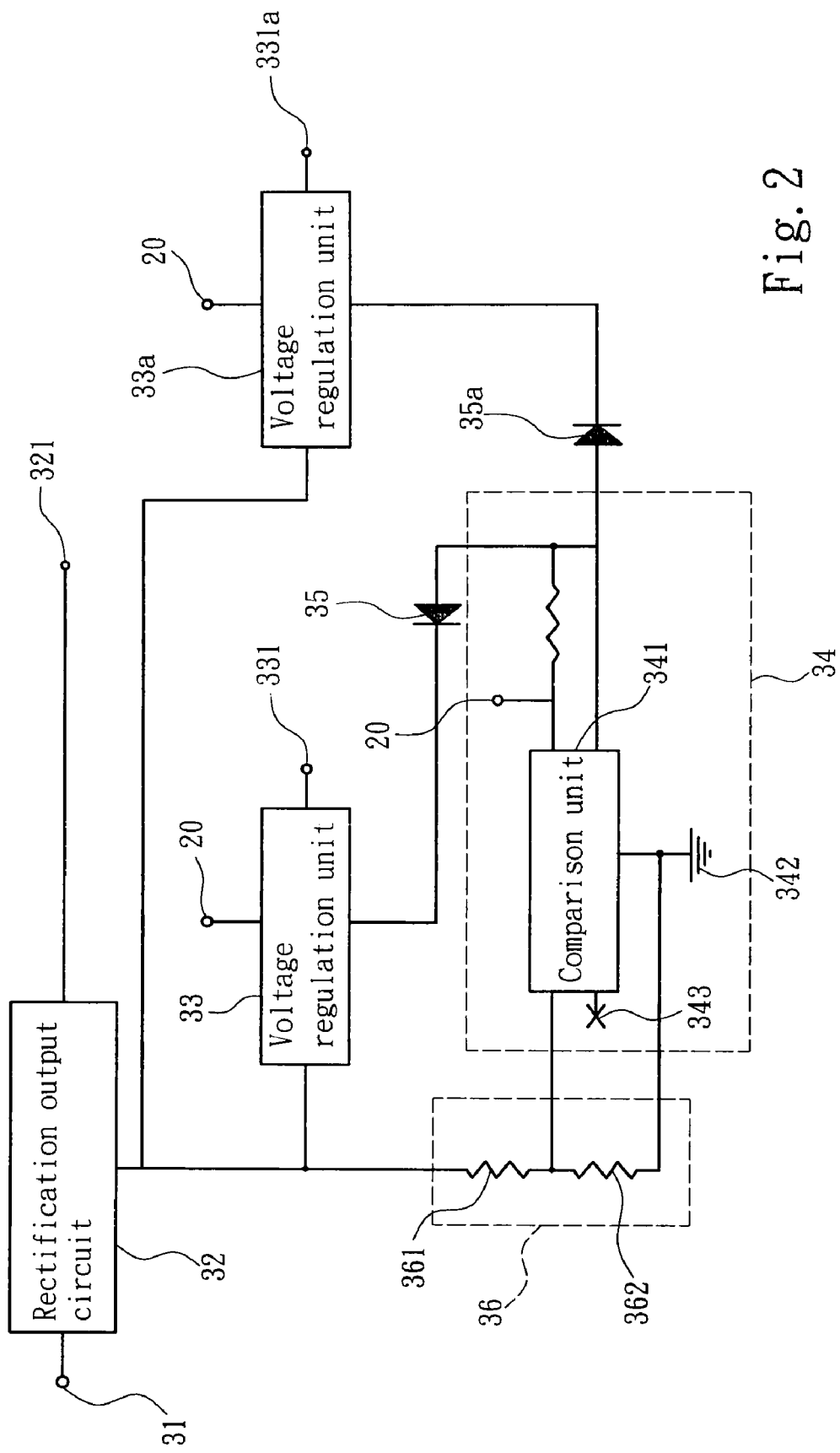
FIG. 2 is a circuit diagram of an embodiment of the multi-output power supply of the invention.

Refer to FIG. 2 for the circuit diagram of an embodiment of the invention. The rectification output circuit 32 of the main power system 30 receives the voltage-transformed electric power from the transformer 31 and regulates to become the first output power 321. After the voltage boosting period ($T_R$) is elapsed, the first output power 321 reaches a standard potential to be used by the computer system to process the load. The main power system 30, aside from providing the first output power 321 through the rectification output circuit 32, also can regulate the first output power 321 to become the second output power 331 and 331a of different potentials through the voltage regulation units 33 and 33a connecting to the rectification output circuit 32. The voltage regulation units 33 and 33a are connected to the standby power system 20 to get the standby power 21 to be activated. The voltage regulation units 33 and 33a also are connected to the output time series judgment circuit 34 to get the feedback signal to determine whether to regulate the first output power 321 to the second output power 331 and 331a. The output time series judgment circuit 34 and the voltage regulation units 33 and 33a are bridged by diodes 35 and 35a. The diodes 35 and 35a have respectively an anode connecting to the output time series judgment circuit 34 and a cathode connecting to the voltage regulation units 33 and 33a. The output time series judgment circuit 34 includes a comparison unit 341 to receive and compare the potential of the first output power 321 with a preset reference potential 343 and a voltage source to provide electric power for the feedback signal. The comparison unit 341 has a ground end 342 to direct grounding of the feedback signal. The voltage source to provide the electric power for the feedback signal is the standby power system 20. Namely, in this embodiment the standby power system 20 serves concurrently as the starting voltage for the comparison unit 341 and the voltage source of the feedback signal. When the standby power system 20 regulates and generates the standby power 21, the voltage regulation units 33 and 33a and the comparison unit 341 receive the standby power 21 and are activated. In addition, the standby power serving as the voltage source of the feedback signal also can stop the voltage regulation units 33 and 33a to proceed voltage regulation. Before the first output power 321 generated by the rectification output circuit 32 entering the output time series judgment circuit 34, it passes through a voltage division circuit 36 consisting of two resistors 361 and 361. Through the resistance ratio of the two resistors 361 and 362, the potential of the first output power 321 sent to the output time series judgment circuit 34 can be regulated. In the event that the first output power 321 received by the comparison unit 341 is smaller than the preset reference potential 343, the feedback signal provided by the standby power system 20 is continuously sent to the voltage regulation units 33 and 33a through the diodes 35 and 35a, then the voltage regulation units 33 and 33a stop regulation of the first output power 321 to the second output power 331 and 331a. On the other hand, if the first output power 321 received by the comparison unit 341 is greater than the preset reference potential 343, the feedback signal provided by the standby power system 20 is directed to the ground end 342 without going to the voltage regulation units 33 and 33a, then the voltage regulation units 33 and 33a regulate the first output power 321 in a normal manner to the second output power 331 and 331a. As the feedback signal is output or grounded synchronously, the voltage regulation units 33 and 33a also perform voltage regulation at the same time to facilitate control the duration of the regulation time ($T_M$). Thus the invention, through generation of the delay time, can regulate the output time of the second output power 331 and 331a delivered from the voltage regulation units 33 and 33a.

As a conclusion, the multi-output power supply of the invention can regulate output time difference of DC power of different voltages to facilitate detection of the motherboard of a computer system during machine start process to prevent start failure. It provides a significant improvement over the conventional techniques.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A multi-output power supply connecting to a power source to receive input power comprising a standby power system to transform the input power to standby power and a main power system which has a transformer to receive the input power and regulate the voltage thereof to become voltage-transformed electric power and a rectification output circuit connecting to the transformer to regulate the voltage-transformed electric power to become first output power, the power supply further including:

an output time series judgment circuit which is respectively electrically connected to the rectification output circuit and the standby power system to receive the first output power and the standby power to be activated therewith, and has a preset reference potential compared with the potential of the first output power to determine whether to output a feedback signal; and a plurality of voltage regulation units electrically connected to the rectification output circuit to receive respectively the standby power output from the standby power system and the feedback signal from the output time series judgment circuit to be activated normally and determine a regulation time spot to synchronously regulate the first output power to second output power.

2. The multi-output power supply of claim 1, wherein the output time series judgment circuit has a comparison unit to receive the potential of the first output power compared with the preset reference potential and a voltage source to provide electric power for the feedback signal.

3. The multi-output power supply of claim 2, wherein the comparison unit has a ground end to direct grounding of the feedback signal.

4. The multi-output power supply of claim 2, wherein the voltage source to provide electric power for the feedback signal is the standby power system.

5. The multi-output power supply of claim 1, wherein the output time series judgment circuit and the voltage regulation units are bridged by a diode which has an anode connecting to the output time series judgment circuit and a cathode connecting to the voltage regulation units.

6. The multi-output power supply of claim 1, wherein the rectification output circuit and the output time series judgment circuit are bridged by a voltage division circuit.

7. The multi-output power supply of claim 6, wherein the voltage division circuit includes two resistors, the resistance ratio of the two resistors regulating the potential of the first output power sending to the output time series judgment circuit.

* * * * *